United States Patent

Bunemann et al.

[11] Patent Number: 5,211,884
[45] Date of Patent: May 18, 1993

[54] LUBRICANTS

[75] Inventors: Thomas F. Bunemann, Zevenhuizen; Robertus W. Pierik, Krimpen aan den Ijssel, both of Netherlands

[73] Assignee: Unilever Patent Holdings BV, Vlaardingen, Netherlands

[21] Appl. No.: 703,103

[22] Filed: May 22, 1991

[30] Foreign Application Priority Data

May 22, 1990 [EP] European Pat. Off. ........ 90305537.4

[51] Int. Cl.$^5$ ................. C10M 105/34; C10M 105/38
[52] U.S. Cl. ................. 252/56 S; 252/56 R; 252/67; 252/68
[58] Field of Search ................. 252/67, 68, 56 S, 56 R

[56] References Cited

U.S. PATENT DOCUMENTS

| | | | |
|---|---|---|---|
| 2,807,155 | 9/1957 | Williamitis | 62/117.7 |
| 3,878,112 | 4/1975 | Luck et al. | 252/10 |
| 4,113,642 | 9/1978 | Koch et al. | 252/56 S |
| 4,234,497 | 11/1980 | Honig | 260/410.6 |
| 4,755,316 | 7/1988 | Magid et al. | 252/68 |
| 4,826,633 | 5/1989 | Carr et al. | 252/56 S |
| 4,851,144 | 7/1989 | McGraw et al. | 252/68 |
| 4,959,169 | 9/1990 | McGraw et al. | 252/68 |
| 5,096,606 | 3/1992 | Hagihara et al. | 252/56 S |

FOREIGN PATENT DOCUMENTS

| | | |
|---|---|---|
| 0406479 | 1/1991 | European Pat. Off. . |
| 458584 | 11/1991 | European Pat. Off. . |
| 468729 | 1/1992 | European Pat. Off. . |
| 133241 | 10/1981 | Japan .................... 252/68 |
| 9012849 | 11/1990 | PCT Int'l Appl. ................ 252/68 |
| 9105831 | 5/1991 | PCT Int'l Appl. . |
| 2216541 | 10/1989 | United Kingdom . |

OTHER PUBLICATIONS

Lederle, Industrial & Engineering Chemistry, vol. 8, pp. 70-71 (Mar. 1969).
Chemical Abstract, vol. 96 71653h (Japanese 80-145638); vol. 102 9492u (Japanese 84 -164393).
JP-A-30/88892 (Kao) (Apr. 1991); JP-A-54/40260 (Ajinomoto); JP-A-56/36570.

Primary Examiner—Ellen McAvoy
Attorney, Agent, or Firm—Cushman, Darby & Cushman

[57] ABSTRACT

A lubricant/working fluid composition for use in mechanical vapor compression type heat transfer devices is described wherein the working fluid is preferably tetrafluoroethane and the lubricant is an ester which is miscible with the working fluid at 10% over a temperature range of −50° C. to +80° C. and has a viscosity of 5 to 100 cSt at 40° C. Useful esters include pentaerythritol partial ester of straight chain $C_5$ or branched chain $C_7$ carboxylic acids. The esters are compatible with non-chlorine containing working fluids and exhibit a low level of corrosion.

9 Claims, No Drawings

LUBRICANTS

This invention relates to lubricants and more particularly to their use in heat transfer devices.

Heat transfer devices of the mechanical vapour recompression type, including refrigerators, heat pumps and air conditioning systems, are well known. In such devices, a working fluid of suitable boiling point evaporates at low pressure taking heat from the surrounding zone. The resulting vapour is then compressed and passed to a condenser where it condenses and gives off heat to a second zone. The condensate is then returned through an expansion valve to the evaporator, so completing the cycle. The mechanical energy required for compressing the vapour and pumping the fluid is provided by, for example, an electric motor or an internal combustion engine.

The working fluids used in these heat transfer devices include chlorofluorocarbons such as dichlorodifluoromethane the production of which is likely to be severely limited by international agreement in order to protect the stratospheric ozone layer. As in the case with other mechanical equipment, it is necessary for the moving parts of the heat transfer devices to be adequately lubricated and the devices are generally designed to use lubricants which are miscible with the working fluids, mineral oil commonly being used in conjunction with dichlorodifluoromethane.

U.S. Pat. No. 4851144 (McGraw et al/The Dow Chemical Company) describes a lubricant composition composed of a polyetherpolyol and an ester which is either made from polyhydric alcohols with alkanoic acids or from alkanedioic acids with alkanols. We have found that such compositions suffer from the disadvantages of generating a level of corrosion in use which may be unacceptable.

British Patent Specification GB-A-2216541 (Imperial Chemical Industries) describes lubricants for use in heat transfer devices, which comprise an ester having a molecular weight greater than 250, such as dipropylene glycol benzoate.

We have now discovered a range of esters which give superior performance to those specifically described by ICI and which avoid the use of polyetherglycols described by McGraw et al.

Thus according to the invention there is provided a lubricant/working fluid composition for use in mechanical vapour compression type heat transfer devices wherein the working fluid is chlorine-free and the lubricant comprises an ester or an ester mixture which is miscible with the working fluid at a level of 10% over a temperature range of $-20°$ C. to $+80°$ C., preferably from $-50°$ C. to $+80°$ C., and has a viscosity of from 5 to 100 cSt measured at 40° C.

We are aware of U.S. Pat. No. 2807155 (Williamitis, assigned to General Motors), which describes the use of pentaerythritol esters, for example of a $C_7$ aliphatic carboxylic acid as lubricants together with chlorine containing working fluids. Williamitis gives no indication as to the suitability of such an ester with non-chlorine containing working fluids.

The non-chlorine containing working fluid may be selected from hydrofluoro-carbons most preferably 1,1,1,2 tetrafluoro ethane, which is available under the trade name R134A.

The lubricant may be an ester of an alkanol or of a polyol. Suitable alkanols are those containing 4 to 18 carbon atoms in a straight or branched, saturated or unsaturated hydrocarbon chain. Typical examples include iso-octanol and 3,5,5, trimethylhexanol. Suitable polyols are the di-, tri-, tetra-, and hexafunctional polyols containing from 4 to 18 carbon atoms. Typical examples include glycerine, ethylene glycol, propylene glycol, mono- pentaerythritol, dipentaerythritol, tripentaerythritol, trimethylolpropanol neopentylglycol and di- trimethylolpropanol. The alkanol or polyol may be alkoxylated, such as ethoxylated and we have found that the use of such materials leads to esters with improved miscibility and viscosity but the level of alkoxylation is preferably low in order to reduce corrosion. Typical examples are ethoxylated penta-erythritol (3EO) and (5EO), and ethoxylated trimethylolpropanol (5EO).

Advantages can be gained from the use of partially esterified polyols and alkoxylated polyols, i.e. where the ester contains some non-esterified -OH groups. This again has been found to improve miscibility. To avoid too high a level of corrosion, we prefer that the ester contains not more than 15% by weight of incompletely esterified polyol.

The lubricant may be the ester of one or more mono-, di- or polyfunctional carboxylic acids. Typical monocarboxylic acids are those containing linear or branched alkyl chains containing from 4 to 10 carbon atoms, such as pentanoic acid, iso-heptanoic acid, octanoic acid and iso-octanoic acid. Typical dicarboxylic acids are those containing from 4 to 12 carbon atoms such as adipic acid or azeleic acid.

Not all esters of the alkanols/polyols and the carboxylic acids specified above will be useful in the present invention, since some will not be sufficiently miscible with the working fluid or they will generate too high a viscosity. We have found that the most preferred esters have one or more of the following features namely, an alkyl chain with 6 or less carbon atoms, branched alkyl chains, alkoxylation, esters of polyols or dicarboxylic acids and partial esterification. To achieve certain viscosity grades it can be of advantage to make a mixture or blend of a lower and a higher viscosity grade ester.

Our most preferred ester is a partial ester of pentaerythritol with a $C_7$ branched carboxylic acid containing approximately 90% by weight of the tetraester and 10% by weight of the triester. Also suitable is the corresponding ester of a straight chain $C_5$ carboxylic acid. The following esters in particular have been found to be unsuitable, namely the full tetraester of pentaerythritol of a mixture of $C_7$–$C_9$ carboxylic acids trimethylolpropane triheptonate (which are not miscible at 10% concentration at $-50°$ C. with R134a) and dimethyl azelate which has too low a viscosity. It would be of advantage if the ester is miscible with any mineral oil lubricant which may have previously been used in the same heat transfer device and of which some traces may still remain. The lubricant/working fluid composition may contain from 0.5% to 20%, such as from 2% to 10% by weight of the ester. Other ingredients which may optionally be present in the composition include the usual additives, such as antioxidants, corrosion inhibitors, metal deactivators, lubricity additives, viscosity index improvers and extreme pressure additives as required, all provided they do not cause the composition to fall outside the miscibility requirement of this invention, although it is an advantage of the invention that the use of such additives may be reduced or dispensed with entirely. The working fluid should be substantially free of any ingredients which significantly increase corrosion and in particular polyether polyols of the type preferred to in U.S. Pat. No. 4851144 should be absent or if not should be present at a level of no more than 5%, most preferably no more than about 1% by weight in the lubricant.

The invention will now be illustrated by the following non-limiting examples.

EXAMPLE 1

Solubility tests

A number of esters were tested for solubility (miscibility) in R134A. The results are expressed below in terms of maximum miscibility at a specified temperature, miscibility generally improving with higher temperature. The viscosity of each ester is also given (cSt at 40° C.).

| Ester | Temperature | Miscibility | Viscosity |
|---|---|---|---|
| Priolube 3939[1] | −?° C. | 2.7% | 23.5 |
| Priolube 3924[2] | −9° C. | 2% | 34.0 |
| Priolube 3970[3] | +6° C. | 2.1% | 19.5 |
| Priolube 1829[4] | −6° C. | 2.5% | 52.0 |
| UCN 8764[5] | −33° C. | 2.2% | 3.1 |
| UCN 83965[6] | −50° C. | 10.1% | 17.3 |
| UCN 90034[7] | −43° C. | 11% | 29.5 |
|  | −50° C. | >10% |  |
| UCN 90089[8] | −50° C. | >10% | 20.4 |
| UCN 90090[9] | −50° C. | >10% | 12.1 |
| UCN 90091[10] | −50° C. | >10% | 17.2 |

Notes
[1] Pentaerythritol (Pe) ester of straight chain $C_5$—$C_9$ carboxylic acid mixture (full tetraester).
[2] Pe ester of straight chain $C_9$ carboxylic acid.
[3] Trimethyolpropane (TMP) ester of straight chain $C_8$—$C_{10}$ carboxylic acid
[4] Mixture of polyethylene glycol (PEG 200) and 2-ethyl hexanol esterified with sebacinic acid.
[5] 2-ethylhexanol esterified with straight chain $C_8/C_{10}$ carboxylic acid.
[6] Pe partial ester of straight chain $C_5$ carboxylic acid (10% triester).
[7] Pe partial ester of branched $C_7$ carboxylic acid (10% triester).
[8] Pe ester of straight chain $C_5$ and $C_8$ and branched $C_7$ and $C_8$ carboxylic acids.
[9] TMP ester of straight chain $C_5$ and $C_8$ and branched $C_7$ and $C_8$ carboxylic acids.
[10] A blend of UCN 90089 and 90090 (70%/30% by weight ratio).

From the above results it is clear that only UCN 83965, 90034, 90089, 90090 and 90091 satisfy the miscibility requirements of the present invention.

Further useful esters and ester mixes according to the invention include:

a) TMP ester of straight chain $C_5$ and $C_8$ and branched $C_7$ and $C_8$ carboxylic acids (average chain length $C_{6.5}$, viscosity 12.9 cSt);

b) TMP ester of straight chain $C_5$ and $C_8$ and branched $C_7$ and $C_8$ carboxylic acids (average $C_{6.5}$) and sebacic acid (viscosity 73.6 cSt);

c) as b) replacing the sebacic acid with adipic acid (39 parts) blended with UCN90.090 (61 parts) - viscosity 26.9 cSt; and d) ethoxylated Pe (5EO) ester of $C_7$ carboxylic acid - viscosity 25.8 cSt.

EXAMPLE 2

For comparison purposes the miscibility of the pentaerythritol ester of heptanoic acid (viscosity 21.3 mm²/S at 40° C.) was investigated. It was found that the ester was not miscible with R134a at temperatures below about 1° C.

EXAMPLE 3

Other esters according to the invention were tested for miscibility with R134a with the following results.

| Ester | Viscosity (40° C.) (cSt) | Phase separation temperature (10%) |
|---|---|---|
| TMP ester of $C_5/C_7$ acids | 12 | <−50° C. |
| Pe ester of $C_5$ acid | 17 | <−50° C. |
| Blend of Pe/iso $C_9$ acid with Pe/$C_5$ acid (61:39 wt %) | 46.7 | <−50° C. |
| Blend of Pe/iso $C_9$ acid with Pe/$C_5$ acid (35:65 wt %) | 29.12 | <−50° C. |
| Blend of Pe/iso $C_9$ acid with Pe/$C_5$ acid (95.7:4.3 wt %) | 99.7 | about −27° C. |

EXAMPLE 4

When ester UCN 90034 together with R134a (1:1 volume) was tested using a shield tube test for corrosion, the test conditions being 170° C. for two weeks followed by analysis for copper, iron and aluminium no corrosion was detected.

We claim:

1. A lubricant/working fluid composition for mechanical vapor compression type heat transfer devices wherein the working fluid is chlorine-free and the lubricant is an ester or an ester mixture consisting essentially of polyol esterified exclusively with carboxylic acid of at least 4 carbon atoms, and which comprises monocarboxylic acid selected from the group consisting of straight chain acids containing up to 5 carbon atoms and branched chain acids containing up to 8 carbon atoms in sufficient amount such that the ester or ester mixture is miscible with the working fluid at a level of 10% over a temperature range of −50° C. to +80° C. and has a viscosity of from 5 to 100 cSt measured at 40° C.

2. The composition of claim 1, wherein the working fluid comprises a hydrofluorocarbon.

3. The composition of claim 1, wherein the ester or the ester mixture contains up to 15% by weight of incompletely esterified polyol.

4. The composition of claim 3 wherein the polyol is pentaerythritol.

5. The composition of claim 1, containing from 0.5% to 20% by weight, preferably from 2% to 10% by weight, of said ester or ester mixture.

6. A composition according to claim 1 wherein the carboxylic acid is straight chain carboxylic acid containing 5 carbon atoms or branched chain carboxylic acid containing 7 carbon atoms.

7. A composition according to claim 6 wherein the polyol is pentaerythritol and the ester mixture contains up to 15% by weight of incompletely esterified polyol.

8. A lubricant/working fluid composition for mechanical vapor compression type heat transfer devices according to claim 1 wherein the working fluid is chlorine-free and the lubricant comprises an ester mixture which is a partial ester of pentaerythritol with a $C_7$ branched or $C_5$ straight chain carboxylic acid and containing up to 15% by weight of incompletely esterified pentaerythritol, the ester mixture being miscible with the working fluid at a level of 10% over a temperature range of −50° C. to +80° C. and having a viscosity of from 5 to 100 cSt measured at 40° C.

9. In a method for obtaining heat transfer involving the evaporation of a lubricant/working fluid composition and its subsequent recompression for repeated evaporation, the improvement which comprises using, as the lubricant/working fluid composition, the composition of claim 1.

* * * * *